US009484162B2

(12) United States Patent
Matsumura

(10) Patent No.: US 9,484,162 B2
(45) Date of Patent: Nov. 1, 2016

(54) POWER SOURCE SWITCH

(71) Applicant: Sumitomo Electric Wiring Systems, Inc., Northville, MI (US)

(72) Inventor: Akihiro Maximilian Matsumura, Farmington Hills, MI (US)

(73) Assignee: Sumitomo Electric Wiring Systems, Inc., Northville (JP)

( * ) Notice: Subject to any disclaimer, the term of this patent is extended or adjusted under 35 U.S.C. 154(b) by 165 days.

(21) Appl. No.: 14/224,703

(22) Filed: Mar. 25, 2014

(65) Prior Publication Data

US 2015/0279583 A1 Oct. 1, 2015

(51) Int. Cl.

| | |
|---|---|
| ***H02B 1/04*** | (2006.01) |
| ***H01H 9/02*** | (2006.01) |
| ***H01H 85/02*** | (2006.01) |
| ***H01H 85/20*** | (2006.01) |
| *H01H 9/10* | (2006.01) |
| *H01H 21/16* | (2006.01) |
| *H01H 37/76* | (2006.01) |
| *H01H 85/54* | (2006.01) |
| *H01H 31/12* | (2006.01) |

(52) U.S. Cl.

CPC ............. *H01H 9/02* (2013.01); *H01H 9/0207* (2013.01); *H01H 85/0241* (2013.01); *H01H 85/2035* (2013.01); *H01H 9/102* (2013.01); *H01H 9/104* (2013.01); *H01H 21/16* (2013.01); *H01H 21/165* (2013.01); *H01H 31/122* (2013.01); *H01H 37/761* (2013.01); *H01H 85/547* (2013.01); *H01H 2085/208* (2013.01)

(58) Field of Classification Search

CPC ........... H01H 9/104; H01H 2085/208; H01H 85/547; H01H 21/16; H01H 9/102; H01H 37/761; H01H 21/165; H01H 31/122; H01H 9/02; H01H 9/0207; H01H 85/0241; H01H 85/2035; H05K 2201/10053; H05K 2201/10181

USPC ....... 361/626, 628, 630, 631, 823, 833, 641, 361/642, 643, 646, 647, 835, 837, 819; 439/76.2, 620.26, 620.3, 620.34, 698, 439/830; 200/50.02, 50.07; 337/186, 187, 337/189, 255

See application file for complete search history.

(56) References Cited

U.S. PATENT DOCUMENTS

| | | | | |
|---|---|---|---|---|
| 5,217,385 A * | 6/1993 | Inoue | .................. | H01R 13/641 439/353 |
| 2007/0272525 A1* | 11/2007 | Suzuki | .................. | H01H 81/02 200/16 R |
| 2008/0266044 A1* | 10/2008 | Nicoletti | .................. | H01H 9/10 337/148 |

* cited by examiner

*Primary Examiner* — James Wu

(74) *Attorney, Agent, or Firm* — Gerald E. Hespos; Michael J. Porco; Matthew T. Hespos

(57) ABSTRACT

A switchable socket assembly (36) permits a power source to be changed. The switchable socket assembly (36) includes a switch guide (38) that communicates with a linear array of terminal fittings that include an output terminal fitting (12) and first and second input terminal fittings (14, 16) on opposite respective sides of the output terminal fitting (12). A switch (40) is slidable in the switch guide (38) and can be moved between first and second positions. In the first position, the switch (40) permits a fuse (30) to connect to the output terminal fitting (12) and the first input terminal fitting (14). In the second position, the switch (40) permits the fuse (30) to connect to the output terminal fitting (12) and the second input terminal fitting (16).

9 Claims, 4 Drawing Sheets

POWER SOURCE SWITCH

BACKGROUND

1. Field of the Invention

The invention relates a switch for changing the power source that supplies power via a fuse or relay to certain components or systems of a vehicle that require electrical power.

2. Description of the Related Art

Automotive vehicles continue to have increasingly complex arrays of components and systems that require electrical power to operate. The power may be derived, for example, from an on-board battery or alternator. The types of electronic components and systems vary considerably from one vehicle model to another for a particular automobile manufacturer, and also can vary from one vehicle to another within a particular model type depending upon the accessories that have been ordered by the purchaser. Changes to electronic components and systems in an automotive vehicle often will require a different arrangement of fuses and relays and may require connection to different power sources.

Automotive vehicles have power distribution boxes, auxiliary boxes or junction boxes for accommodating a large number of fuses and relays. For simplicity, these boxes will be referred to herein as junction boxes. The typical junction box has a housing molded from a synthetic resin. The typical junction box housing is likely to accommodate a plurality of busbars, circuit boards and/or terminal fittings. The junction box housing also is likely to have structures for clamping and/or routing cables and wires therein. Supply or input cables extend from the battery, alternator or other power source on the vehicle to the junction box housing and connect to busbars or terminal fittings in the junction box for supplying power. Output wires also extend from other busbars or terminal fittings in the junction box to the various components and systems of the vehicle that require power.

The junction box housing also is molded to define a plurality of sockets into which fuses and relays are replaceably mounted. In this regard, the typical fuse or relay has a housing formed from a nonconductive material. A power limiting means is embedded in the fuse or relay housing. Blade terminals connect to the power limiting means in the fuse or relay and project from the housing. The blade terminals project in a common direction and typically lie in a common plane. The typical fuse or relay has two parallel blades projecting from the housing. However, some fuses and relays have three parallel blades projecting from the housing and disposed in a common plane (e.g. a micro3 fuse). The fuse or relay is mounted into the appropriate socket of the junction box so that the blade terminals of the fuse or relay connect to terminal fittings or busbars in the junction box.

The fuses and relays are selected in accordance with the power limits of the corresponding electronic component to which the power will be supplied. Additionally, the power source to which the fuse or relay is connected depends upon the characteristics of the component or system to which the power will be supplied.

The automotive industry is highly competitive with respect to the cost charged to purchasers and with respect to the costs that will be charged by vendors and suppliers of the components that are incorporated into the vehicle. Even small savings in cost and minor improvements in efficiency can be commercially very advantageous.

The many different types of electronic components and systems often require different arrangements of fuses and relays and require the fuse or relay that is connected to a particular component or system to receive power from a different power source. Providing an entirely different junction box for each possible arrangement of the electronic components is economically infeasible. The junction box can be re-opened and the wiring therein can be changed to accommodate a need for a different power source. However, the interior of the junction box is extremely complex and varies considerably from one vehicle to another. As a result, rewiring mistakes are highly likely and can cause significant damage to the electrical system of the vehicle. Damage of this type can affect the way the vehicle will perform, and hence can be very dangerous. Furthermore, changes to the circuitry within a junction box are very time-consuming and therefore impose a significant cost penalty.

Junction boxes could be designed with extra sockets for fuses or relays or with sockets that can accommodate fuses or relays in different positions depending upon the required power source. For example, the inventor herein has considered a junction box with a linear array of three adjacent terminal fittings comprising: a middle terminal fitting connected to an output line and first and second end terminal fittings connected respectively to first and second input lines that deliver power from first and second power sources respectively. A fuse or relay could be connected to the middle terminal fitting and a first of the end terminal fittings for connection to a first power source or could be connected to the middle terminal fitting and the second of the end terminal fittings for connection to the second power source. However, this option creates the potential for inserting the fuse or relay into engagement with the wrong terminal fittings or busbars in the junction box, thereby providing connection to the wrong power source. Furthermore, a linear arrangement of three terminal fittings on a junction box could be misinterpreted as intended for the commercially available fuses with three parallel blade terminals. Connection of the fuse or relay to the wrong power source or incorrect connection of a three-blade fuse to two power sources could cause substantial damage to the circuitry within the junction box and to the component to which the power is supplied.

In view of the above, it is an object of the invention to provide a junction box with an ability to switch the power source for an electronic component or system of a vehicle while avoiding improper connection of fuses or relays to the optional power sources.

SUMMARY OF THE INVENTION

The invention relates to a power source switch for use with a junction box or power distribution box of an automotive vehicle and to a junction box or power distribution box provided with such a power source switch. For simplicity, the various types of boxes with which the power source switch can be used will be referred to herein as junction boxes. The junction box of the invention includes a housing that includes an array of terminal fittings, busbars and/or circuit boards therein. The junction box is configured to accommodate wires or cables from at least two power sources on a vehicle, such as a battery and an alternator. The junction box further is configured to accommodate wires or cables that extend from the junction box to various components or systems in the vehicle that require electric power.

The input power supply cables or wires and the output wires are connected appropriately to the terminal fittings or busbars in the junction box.

The housing of the junction box further has a base wall and socket walls that project from the base wall to define fuse or relay sockets. The portion of the base wall in each socket has at least two openings that communicate with the interior of the junction box housing and with terminal fittings or busbars in the interior of the junction box housing. The socket walls are disposed and configured to guide fuses or relays into the respective socket so that the blades of the fuse or relay pass through the openings in the base wall at the respective socket and engage with in the terminal fittings or busbars associated with the respective socket.

At least one socket of the junction box is a switchable socket assembly with a switch guide that at least partly surrounds a linear array of three openings that extend through the base wall of the housing and communicate respectively with three terminal fittings in the interior of the junction box housing. The switch guide includes first and second opposed side walls that project from the base wall of the junction box housing. Each side wall of the switch guide includes opposite front and rear ends. A rear wall may extend between rear ends of the sidewalls. The switch guide has no front wall extending between front ends of the sidewalls. Thus, the front end of the switch guide is open to define an entrance to the switch guide. Surfaces of the sidewalls of the switch guide that face one another are formed with grooves substantially adjacent the base wall of the housing. The grooves extend rearward from the entrance to the switch guide toward the rear ends of the sidewalls. The sidewalls of the switch guide may further include locking recesses that preferably are in proximity to entrance to the switch guide.

The three terminal fittings associated with the switchable socket assembly include an output terminal fitting connected to an output wire and first and second input terminal fittings disposed on opposite respective sides of the output terminal fitting and connected respectively to first and second input lines from first and second different power sources.

The switchable socket assembly further includes a switch that is mounted slidably on the base wall of the junction box housing between the first and second sidewalls of the switch guide for movement parallel to the sidewalls of the switch guide. The switch includes a bottom wall with opposite front and rear ends and opposite first and second sides. The bottom wall of the switch is dimensioned to fit in the grooves formed in the respective sidewalls of the switch guide. Resiliently deflectable locks preferably are formed on the bottom wall and can fit resiliently in the locking recesses formed in the sidewalls of the switch guide.

Fuse receptacle walls project from the bottom wall of the switch and have outer dimensions to be received slidably between the sidewalls of the switch guide. Inwardly facing surfaces of the fuse receptacle walls are configured and disposed to receive a fuse housing therein. The bottom wall of the fuse receptacle is open at areas inward of the fuse receptacle walls so that blade terminals of the fuse can pass through the bottom wall when the fuse housing is inserted into the area bounded by the fuse receptacle walls of the switch.

The switch is movable slidably within the switchable socket of the junction box between a first position where the opening in the bottom wall of the fuse receptacle aligns with the output terminal and the first input terminal and a second position where the opening in the bottom wall of the fuse receptacle aligns with the output terminal and the second input terminal. As a result, the fuse can be connected to alternate first and second power sources depending upon the slidable position of the switch in the switchable socket assembly of the junction box. The fuse receptacle walls of the switch prevent a blade terminal of the fuse from being connected to the second input terminal when the fuse receptacle is in the first position and prevent a blade terminal of the fuse from being connected to the first input terminal when the fuse receptacle is in the second position. Additionally, the fuse receptacle walls prevent a fuse with three blades from being connected to the linear array of three terminal fittings provided in the switchable socket assembly.

The resiliently deflectable locks of the switch may be engaged in the locking recesses of the sidewalls when the fuse is at the first position.

At least one of the sidewalls of the switchable socket assembly may be provided with indicia that aligns with corresponding indicia on the switch when the fuse switch is in a selected one of the first and second positions. The aligned indicia on the sidewalls and on the switch provide clear visual indication to an operator of the position of the switch relative to the switch guide of the switchable socket assembly.

DETAILED DESCRIPTION OF THE PREFERRED EMBODIMENT

Figure 1A:
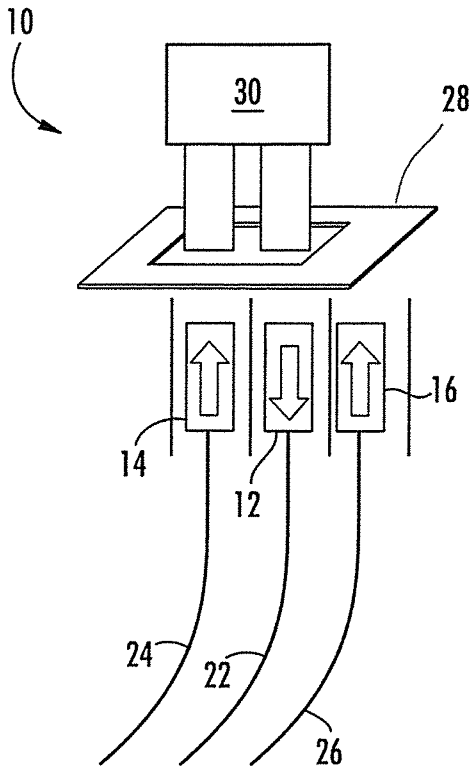
FIGS. 1A and 1B are schematic illustrations of a switchable fuse socket assembly and in accordance with the subject invention.
Figure 1B:
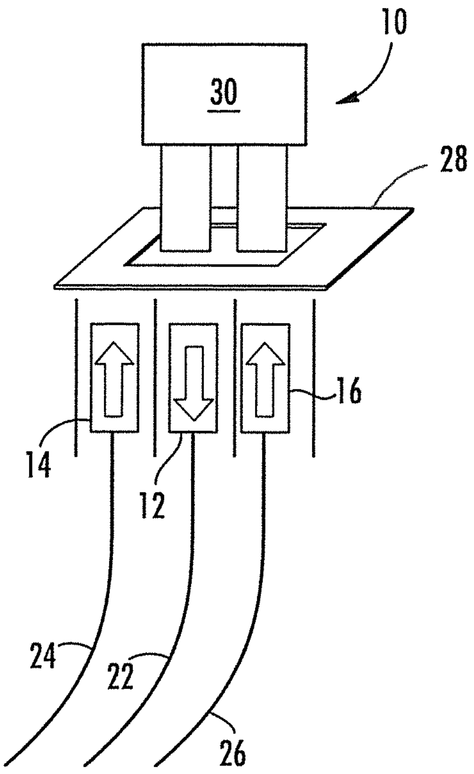

A switchable socket assembly in accordance with the subject invention is illustrated schematically in FIGS. 1A and 1B and is identified generally by the numeral 10. The switchable socket assembly 10 is for use with a junction box that has an output terminal fitting 12 and first and second input terminal fittings 14 and 16 arranged in a linear array so that the output terminal fitting 12 is between the first and second input terminal fittings 14 and 16. The output terminal fitting 12 is connected to an output line 22 that extends to an appropriate electronic component or system in a vehicle. The first and second input terminal fittings 14 and 16 are connected respectively to first and second input lines 24 and 26 that deliver electric power from first and second power sources, such as a battery and an alternator of a vehicle. The switchable socket assembly 10 further includes a switch 28 that can be moved from a first position, as illustrated in FIG. 1A, and a second position, as illustrated in FIG. 1B. The disposition of the switch 28 in the first position of FIG. 1A permits a fuse 30 to be connected to the output terminal 12 and the first input terminal 14. The disposition of the switch 28 in the second position of FIG. 1B permits the fuse 30 to be connected to the output terminal 12 and the second input terminal 16. Thus, the power source with which the output line 22 communicates is determined by the relative position of the switch 28.

Figure 2:
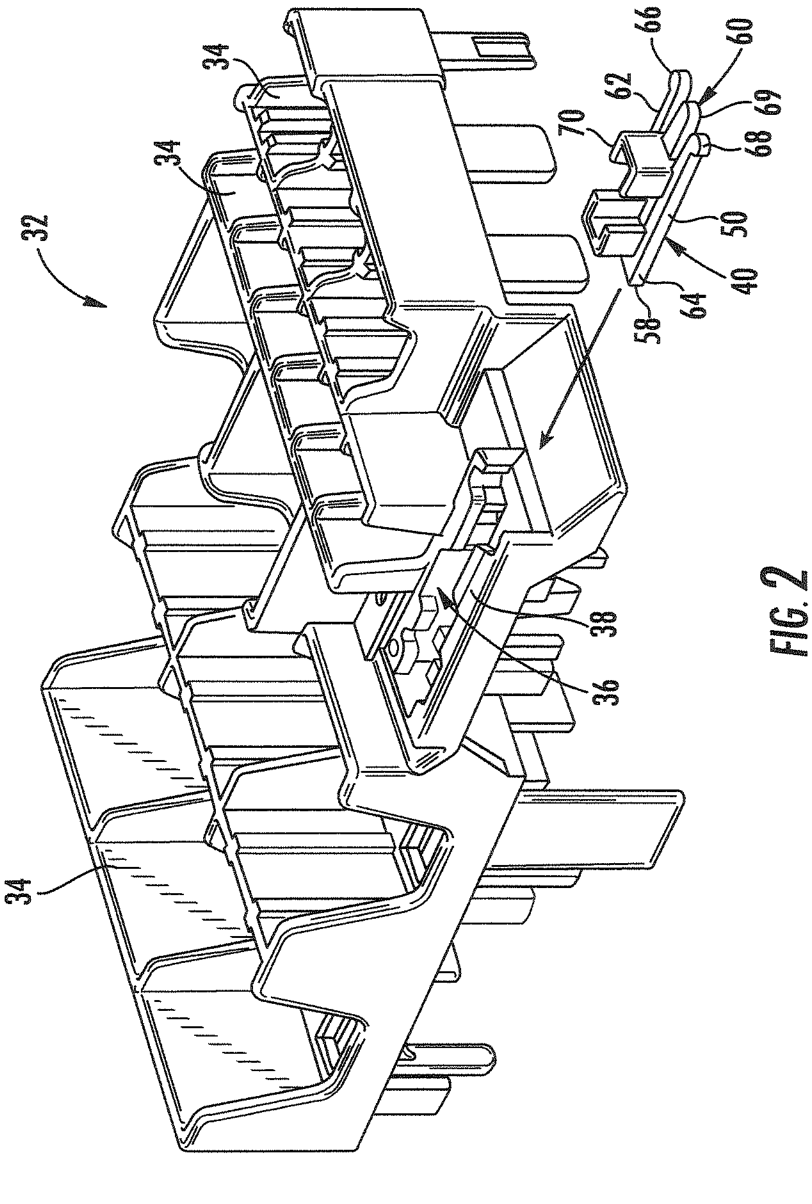
FIG. 2 is an exploded perspective view of a junction box with the switchable socket assembly of the invention.

The invention illustrated schematically in FIGS. 1A and 1B is illustrated in greater detail in FIGS. 2-8 to show a particular exemplary embodiment. In this regard, FIG. 2 illustrates a portion of a junction box 32, such as a power distribution box for delivering electric power from a plurality of different power sources in a vehicle to appropriate electronic complements of the vehicle. The junction box 32 includes a plurality of fixed dedicated fuse or relay sockets 34 that can receive appropriate fuses or relays that will be connected to terminal fittings or busbars below the portion of the junction box 32 illustrated in FIG. 2. The junction box 32 further includes at least one switchable socket assembly 36 that includes a switch guide 38 molded unitarily with the portion of the junction box 32 illustrated in FIG. 2 and a switch 40 that is slidably engageable with the switch guide 38. The switch 40 illustrated in FIG. 2 corresponds to the switch 28 illustrated schematically in FIGS. 1A and 1B.

With reference to FIGS. 3-8, the switch guide 38 of the switchable socket assembly 36 includes a substantially planar base wall 41 with a linear array of openings that include an output opening 42 and first and second input openings 44 and 46 respectively. The output opening 42 communicates with an output terminal comparable to the output terminal 12 illustrated schematically in FIGS. 1A and 1B. The first and second input openings 44 and 46 communicate with first and second input terminals comparable to the first and second input terminals 14 and 16 illustrated schematically in FIGS. 1A and 1B.

The switch guide 38 furthering includes first and second substantially parallel side walls 48 and 50 that project unitarily from the base wall 41. The side walls 48 and 50 are provided respectively with front ends 48F and 50F and rear ends 48R and 50R. A rear wall 52 connects the rear ends 48R and 50R of the first and second side walls 48 and 50. However, no front wall extends between the front ends 48F and 50F of the side walls 48 and 50, thereby defining an entrance 54 to the switch guide 38. The side walls 48 and 50 are formed respectively with grooves 48G and 50G facing one another at positions adjacent the base wall 41. Additionally, locking recesses 48L and 50L are formed respectively in facing surfaces of the side walls 48 and 50 in proximity to the entrance 54 of the switch guide 38.

The switch 40 of the switchable socket assembly 36 is molded unitarily from a synthetic resin and includes a substantially planar bottom wall 56. The bottom wall 56 has opposite front and rear ends 58 and 60 and opposite first and second side edges 62 and 64 extending between the front and rear ends 58 and 60. The bottom wall 56 is dimensioned to be received slidably on the base wall 41 of the switch guide 38 with opposite first and second side edges 62 and 64 of the bottom wall 56 being slidably received in the grooves 48G and 58G of the respective first and second side walls 48 and 50 of the switch guide 38. Resiliently deflectable first and second locking latches 66 and 68 are cantilevered rearwardly from the rear end 60 of the bottom wall 56 and are configured to be retained in the locking recesses 48L and 50L of the respective first and second side walls 48 and 50. A projection 69 is formed between the locking latches 66 and 68 to prevent over deflection of the latches 66 and 68.

A fuse receptacle wall 70 projects up from the bottom wall 56 and is configured to receive a housing of a fuse, such as the fuse 30. A portion of the bottom wall 56 of the switch 40 bounded by the fuse receptacle 70 includes an opening 72 to accommodate blades 74 of the fuse 30.

Figure 3:
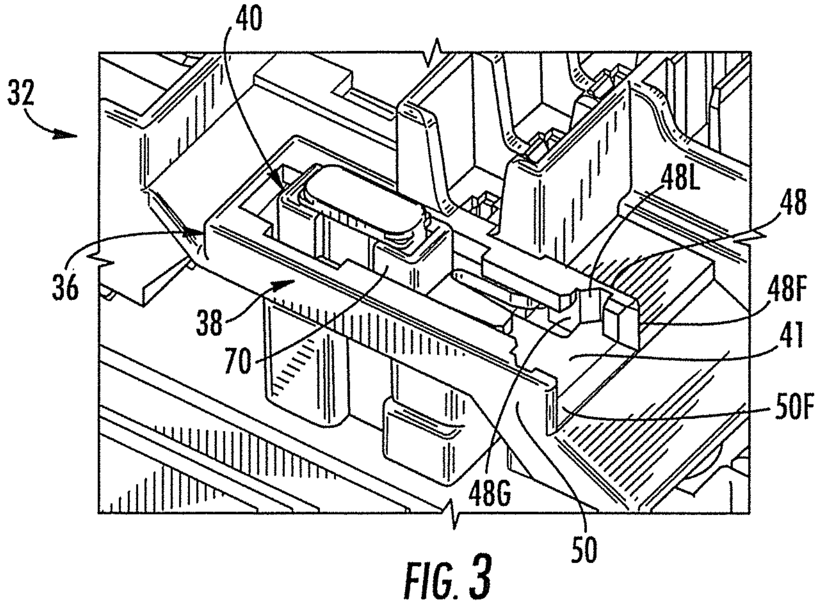
FIG. 3 is a perspective view of the junction box of FIG. 2 in the assembled condition and with the switch in a first position.
Figure 4:
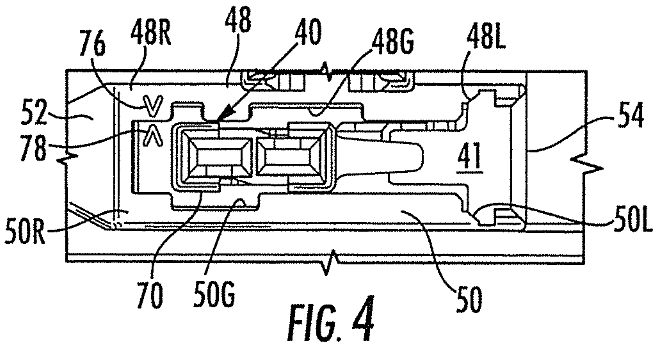
FIG. 4 is a top plan view of the junction box of FIG. 3.
Figure 5:
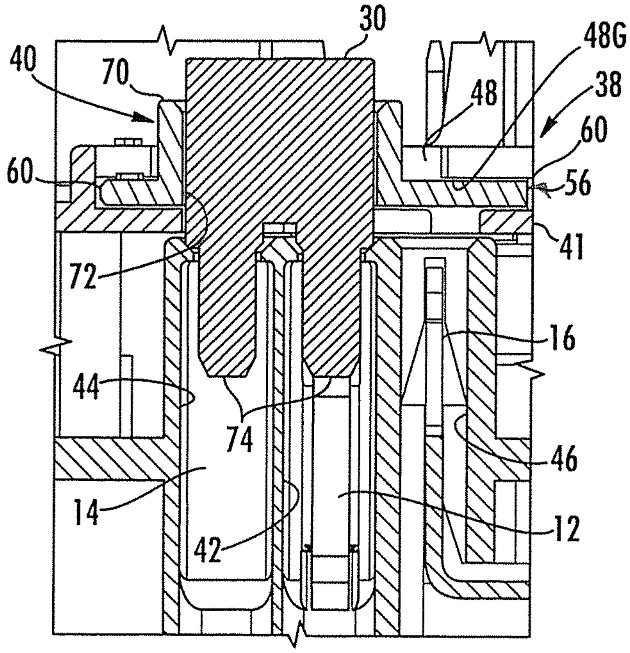
FIG. 5 is a cross-sectional view taken along line 5-5 in FIG. 4.
Figure 6:
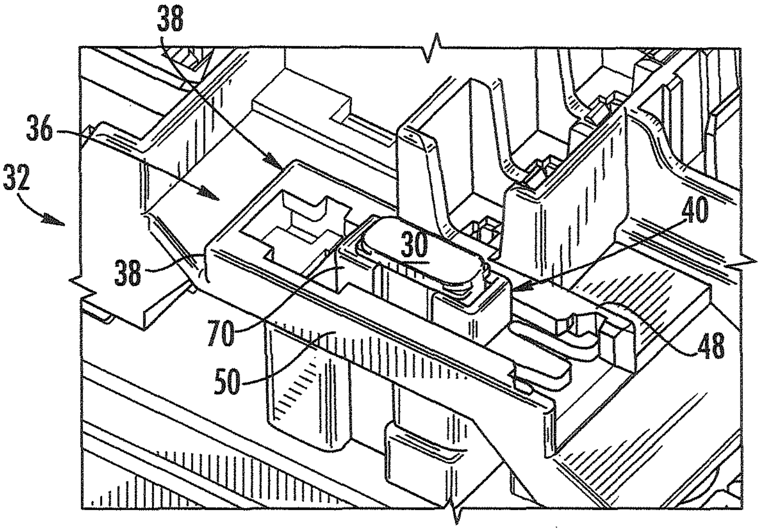
FIG. 6 is a perspective view of the junction box of FIG. 2 in the assembled condition and with the switch in a second position.
Figure 7:
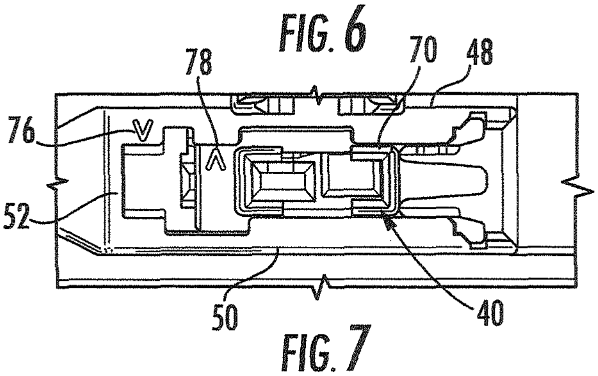
FIG. 7 is a top plan view of the junction box of FIG. 6.
Figure 8:
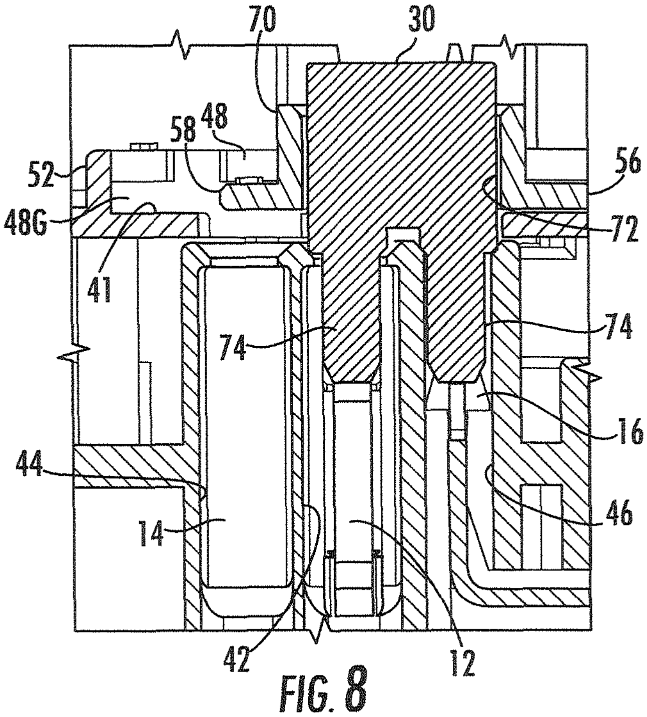
FIG. 8 is a cross-sectional view taken along line 8-8 in FIG. 7.

The switch 40 can be slid on the base wall 41 of the switch guide 38 between a first position as illustrated in FIGS. 3-5 and a second position as illustrated in FIGS. 6-8. The opening 72 in the bottom wall 56 of the switch 40 aligns with the output opening 42 and the first input opening 44 in the base wall 41 of the switch guide 38 when the switch 40 is in the first position illustrated in FIGS. 3-5. However, parts of the bottom wall 56 of the switch 40 in proximity to the rear end 60 of the bottom wall 56 at least partly block the second input opening 46 in the base wall 41 of the switch guide 38, as shown in FIG. 5. As a result, the fuse 30 can be inserted into the fuse receptacle 70 so that the blades 74 of the fuse 30 can pass through the opening 72 in the bottom wall 56 of the switch 40, through the output opening 42 and the first input opening 44 in the base wall 41 of the switch guide 38 and into electrical connection with the output terminal 12 and the first input terminal 14 when the switch 40 is in the first position. However, the switch 40 prevents either blade 74 of the fuse 30 from making electrical connection with the second input terminal 16.

On the other hand, the switch 40 can be slid on the base wall 41 of the switch guide 38 and into the second position, as illustrated in FIGS. 6-8. The opening 72 in the bottom wall 56 of the switch 40 aligns with the output opening 42 and the second input opening 46 in the base wall 41 of the switch guide 38 when the switch 40 is in the second position illustrated in FIGS. 6-8. However, parts of the bottom wall 56 of the switch 40 in proximity to the front end 58 of the bottom wall 56 at least partly block the first input opening 46 in the base wall 41 of the switch guide 38, as shown in FIG. 8. As a result, the fuse 30 can be inserted into the fuse receptacle 70 so that the blades 74 of the fuse 30 can pass through the opening 72 in the bottom wall 56 of the switch 40, through the output opening 42 and the second input opening 46 in the base wall 41 of the switch guide 38 and into electrical connection with the output terminal 12 and the second input terminal 16 when the switch 40 is in the second position, as shown in FIGS. 6-8. However, the switch 40 prevents either blade 74 of the fuse 30 from making electrical connection with the first input terminal 14.

The first sidewall 48 is provided with indicia 76 and the bottom wall 56 of the switch 40 is provided with indicia 78. The indicia 78 on the bottom wall 56 of the switch 40 and the indicia 76 on the first sidewall 48 align when the switch 40 is in the first position, as shown in FIG. 4. However, the indicia 76 and 78 do not align when the switch 40 is in the second position, as shown in FIG. 7. The relative positions of the indicia 76 and 78, therefore, provide a clear visual indication to an operator of whether the switch 40 is in the proper position.

The switchable socket assembly 36 enables a power source to be changed easily without disassembling the junction box or power distribution box. Additionally, the switchable socket assembly positively prevents the fuse 30 or relay from being connected to the improper power supply terminal and further prevents a fuse with three blades from being connected inadvertently to all three terminals of the switchable socket assembly 36.

The invention has been described and illustrated with respect to a preferred embodiment. However, various changes can be made without departing from the scope of the invention as defined by the appended claims.

The illustrated embodiment depicts only one switchable socket assembly 36. However, the junction box may be provided with a plurality of switchable socket assemblies.

The illustrated embodiment shows a locked engagement between the switch 40 and the switch guide 38 at only one of the two optional positions. However, locked engagement at both optional positions can be provided.

The illustrated embodiment shows the switchable socket assembly 36 as part of a junction box or power distribution box. However, the switchable socket assembly need not be part of a housing that has other uses or relays.

I claim:

1. A switchable socket assembly for a fuse or relay that has two blades, comprising:

a housing with an output terminal fitting and first and second input terminal fittings on opposite respective sides of the output terminal fittings to define a substantially linear array;

a switch guide in a fixed position on the housing and extending substantially parallel to the linear array, the switch guide further having a base wall with an opening that provides communication to the output terminal and the input terminals; and a switch formed from a synthetic resin and having a bottom wall with at least one opening dimensioned for permitting the two blades of the fuse or relay to be inserted therethrough, the switch being slidable linearly along the switch guide from a first position where the opening in the bottom wall of the switch aligns with and permits access to the output terminal fitting and the first input terminal fittings and a second position where the opening in the bottom wall of the switch aligns with and permits access to the output terminal fitting and the second input terminal fitting.

2. The switchable socket assembly of claim 1, wherein the switch further includes a fuse receptacle projecting from the bottom wall and surrounding the opening therein for guiding the fuse or relay toward the opening.

3. The switchable socket assembly of claim 1, wherein the switch is configured to block the second output terminal when the switch is in the first position and to block the first output terminal when the switch is in the second position.

4. The switchable socket assembly of claim 1, wherein the switch includes at least one latch for engaging the switch guide to hold the switch in at least one of the first and second positions.

5. The switchable socket assembly of claim 1, wherein the switch guide includes first and second substantially parallel side walls and the switch being slidably engaged between the sidewalls of the switch guide.

6. The switchable socket assembly of claim 5, wherein the sidewalls are performed with grooves slidably engaged with opposite side edges of the switch.

7. A junction box or power distribution box for a fuse or relay that has two blades, comprising:

a base wall with a linear array of three openings formed therethrough including an output opening and first and second input openings on opposite respective sides of the output opening;

an output terminal fitting mounted in proximity to the base wall and substantially aligned with the output opening;

first and second input terminal fittings mounted in proximity to the base wall and substantially aligned respectively with the first and second input openings, the first and second input terminal fittings being connected to first and second power sources respectively;

a switch guide in a fixed position on the base wall and having first and second side walls projecting from the base wall on opposite respective sides of the linear array of openings; and a switch formed from a synthetic resin and having a bottom wall with at least one opening dimensioned for permitting the two blades of the fuse or relay to be inserted therethrough, the switch being movable between the first and second side walls of the switch guide from a first position where the opening in the bottom wall of the switch aligns with and permits access to the output terminal fitting and the first input terminal fitting and a second position where the opening in the bottom wall of the switch aligns with and permits access to the output terminal fitting and the second input terminal fitting.

8. The junction box or power distribution box of claim 7, wherein the switch further includes a fuse receptacle projecting from the bottom wall and surrounding the opening therein for guiding a fuse or relay toward the opening.

9. The junction box or power distribution box of claim 7, wherein the switch is configured to block the second output terminal when the switch is in the first position and to block the first output terminal when the switch is in the second position.

* * * * *